(12) United States Patent
Lavin

(10) Patent No.: US 10,154,725 B2
(45) Date of Patent: Dec. 18, 2018

(54) THIGH MOUNTED HOLDER

(71) Applicant: Thomas Lavin, Evanston, IL (US)

(72) Inventor: Thomas Lavin, Evanston, IL (US)

(*) Notice: Subject to any disclaimer, the term of this patent is extended or adjusted under 35 U.S.C. 154(b) by 0 days.

(21) Appl. No.: 15/245,127

(22) Filed: Aug. 23, 2016

(65) Prior Publication Data
US 2017/0055686 A1 Mar. 2, 2017

Related U.S. Application Data

(60) Provisional application No. 62/209,137, filed on Aug. 24, 2015.

(51) Int. Cl.
*A45F 5/00* (2006.01)
*H04B 1/3888* (2015.01)
*A45C 11/00* (2006.01)

(52) U.S. Cl.
CPC .............. *A45F 5/00* (2013.01); *H04B 1/3888* (2013.01); *A45C 2011/002* (2013.01); *A45F 2005/008* (2013.01); *A45F 2200/0516* (2013.01)

(58) Field of Classification Search
CPC ........ A45F 2005/008; A45F 2200/0516; A45F 2005/0508
USPC .................... 224/222, 223; D3/215, 218, 224
See application file for complete search history.

(56) References Cited

U.S. PATENT DOCUMENTS

| | | | |
|---|---|---|---|
| D258,246 S * | 2/1981 | Kravchenko | 224/222 |
| D273,344 S * | 4/1984 | Lee | 224/222 |
| 4,705,086 A | 11/1987 | O'Neill | |
| D299,585 S * | 1/1989 | Corwin | 224/223 |
| 4,974,762 A * | 12/1990 | Boretsky | A45C 1/04 224/148.2 |
| 5,215,379 A * | 6/1993 | Pickard | G09F 15/0037 224/222 |
| D352,824 S * | 11/1994 | Saggese, Jr. | D3/215 |
| 5,737,775 A * | 4/1998 | Schwartz | A41D 27/20 2/243.1 |
| D406,455 S * | 3/1999 | Wagner, II | D3/226 |
| D429,880 S * | 8/2000 | McCullough, Jr. | D3/215 |
| D436,243 S * | 1/2001 | Hoy | D2/860 |
| 6,321,957 B1 * | 11/2001 | Rossi | A01K 27/006 206/811 |
| 6,325,260 B1 * | 12/2001 | Gorham | A45C 1/04 206/69 |
| 6,357,639 B1 * | 3/2002 | Williams | A01K 97/10 224/200 |

(Continued)

*Primary Examiner* — Justin Larson
(74) *Attorney, Agent, or Firm* — Global Intellectual Property Agency, LLC; Daniel Boudwin

(57) ABSTRACT

A holder mountable to a thigh for storing an electronic mobile device. The thigh mounted holder includes a first end removably securable to an opposing second end to form a loop such that the holder can fit tightly to the thigh of a user. The opposing ends connect via a fastener. The thigh mounted holder further includes a front panel secured to a rear panel via a seam. The front panel and the rear panel form a first pocket disposed centrally between the first and second end of the holder, wherein the first pocket can support a mobile electronic device in an upright configuration. A second and third pocket are formed between the front and rear panel, adjacent to the first pocket. An alignment member is disposed on the front panel for indicating to the user by touch the location of the first pocket when attached to the thigh.

11 Claims, 4 Drawing Sheets

(56) References Cited

U.S. PATENT DOCUMENTS

| | | | |
|---|---|---|---|
| D474,594 S | | 5/2003 | Casparian |
| D487,844 S | * | 3/2004 | Nichols ............................ D3/215 |
| D495,484 S | * | 9/2004 | Marks ............................. D3/215 |
| D496,155 S | * | 9/2004 | Londono ......................... D3/215 |
| D501,990 S | * | 2/2005 | Carr ................................ D3/215 |
| D538,036 S | * | 3/2007 | Buck ............................... D3/224 |
| 7,243,824 B2 | | 7/2007 | Tabata |
| D646,052 S | * | 10/2011 | Phelps ............................ D3/218 |
| D659,381 S | * | 5/2012 | Fahrendorff .................... D3/218 |
| 9,219,516 B2 | * | 12/2015 | Haymond ............ H04B 1/3888 |
| D758,716 S | * | 6/2016 | Tao ................................. D3/218 |
| 9,438,299 B2 | * | 9/2016 | Haymond ............ H04B 1/3888 |
| D794,949 S | * | 8/2017 | Zimmer .......................... D2/627 |
| D799,814 S | * | 10/2017 | Reed ............................... D3/215 |
| D820,585 S | * | 6/2018 | O'Brien .......................... D3/224 |
| 2004/0182896 A1 | * | 9/2004 | Ballard ...................... A45F 3/14 |
| | | | 224/222 |
| 2006/0011687 A1 | * | 1/2006 | Wadley ...................... A45F 3/00 |
| | | | 224/587 |
| 2006/0261107 A1 | * | 11/2006 | Daniels ..................... A45C 1/04 |
| | | | 224/219 |
| 2007/0241150 A1 | * | 10/2007 | Meyer ................. A44C 5/0015 |
| | | | 224/219 |
| 2008/0011794 A1 | * | 1/2008 | Daniel ...................... A45F 5/02 |
| | | | 224/183 |
| 2008/0185412 A1 | | 8/2008 | Hollins |
| 2012/0152990 A1 | | 6/2012 | Kulas |

* cited by examiner

THIGH MOUNTED HOLDER

CROSS REFERENCE TO RELATED APPLICATION

This application claims the benefit of U.S. Provisional Application No. 62/209,137 filed on Aug. 24, 2015. The above identified patent application is herein incorporated by reference in its entirety to provide continuity of disclosure.

BACKGROUND OF THE INVENTION

The present invention relates to electronic mobile device holders. More specifically, the present invention provides an electronic mobile device holder that is mountable to a thigh of a user.

People are required to carry around a wide variety of items throughout the day on their person, such as keys, a cell phone, credit cards, and cash. Most of these items are kept in an individual's pocket or a bag. However, carrying around a bag often leaves an individual with only one free hand to perform other tasks. Further, the individual can momentarily set his or her bag aside, wherein the bag can easily be forgotten and left in an area to never be found again.

Alternatively, stuffing these items in a garment pockets can lead the pockets to become very full and uncomfortable. Items may also easily fall out of the pockets because most pockets are not configured to hold and secure a variety of differently shaped objects. Further, many garments do not have pockets, thus creating the need to carry a phone or a wallet by hand. Therefore, there exists a need for a device that can store excess items and take pressure away from the pockets of a person's pants and free up their hands.

Devices have been disclosed in the known art that relate to thigh mounted holders. These devices generally relate to leg mounted holder for a cell phone. These prior art devices have several known drawbacks. These devices fail to provide pockets configured to receive credit cards, cash, and the like. Further, the devices do not provide an alignment member that indicates the positioning of a designated pocket to a user by touch.

In light of the devices disclosed in the known art, it is submitted that the present invention substantially diverges in design elements from the prior art and consequently it is clear that there is a need in the art for an improvement to existing thigh mounted holders. In this regard the instant invention substantially fulfills these needs.

SUMMARY OF THE INVENTION

In view of the foregoing disadvantages inherent in the known types of thigh mounted holders now present in the prior art, the present invention provides a new thigh mounted holder wherein the same can be utilized for providing convenience for the user when storing a mobile electronic device, credit cards, cash, and the like on the user's person.

It is therefore an object of the present invention to provide a new and improved thigh mounted holder that has all of the advantages of the prior art and none of the disadvantages. The thigh mounted holder comprises a first end removably securable to an opposing second end so as to form a loop such that the holder can fit tightly to the thigh of a user. The opposing ends connect via a fastener, such as hook and loop material. The thigh mounted holder further includes a front panel secured to a rear panel via a seam. The front panel and the rear panel form a first pocket disposed centrally between the first and second end of the holder, wherein the first pocket is configured to support a mobile electronic device in an upright configuration. A second and third pocket are formed between the front and rear panel, adjacent to the first pocket. An alignment member is disposed on the front panel for indicating to the user by touch the location of the first pocket when attached to the thigh.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
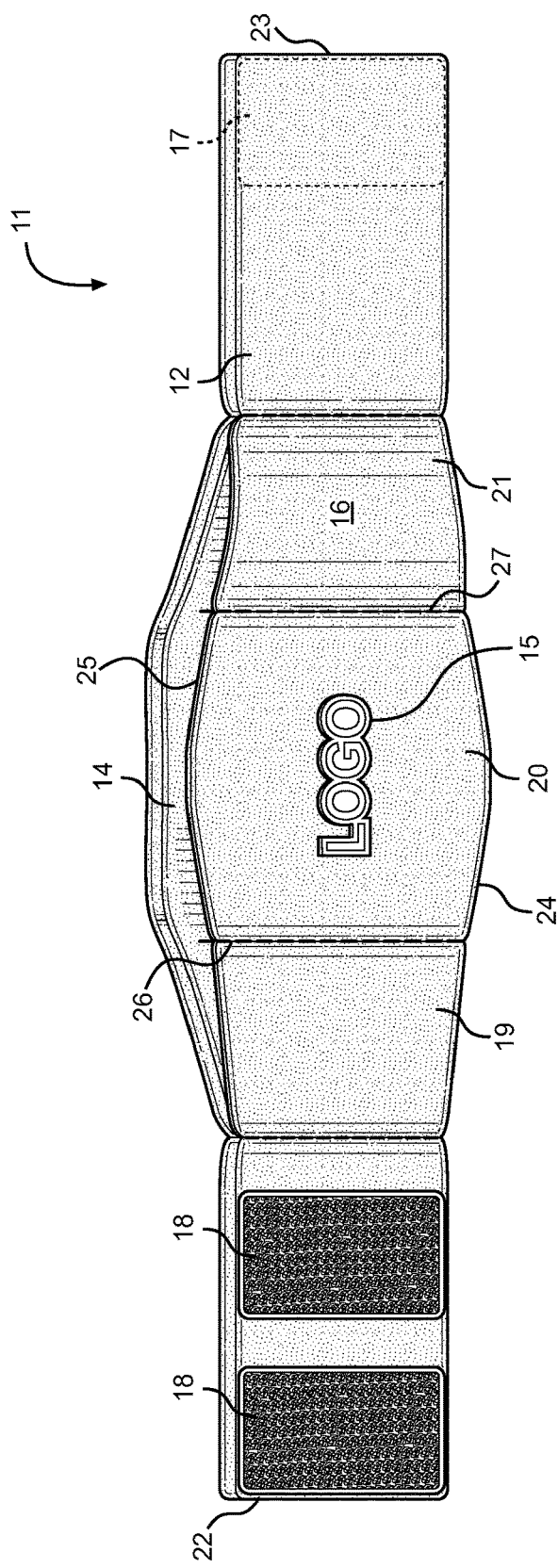
FIG. 1 shows a perspective view of the front side of the thigh mounted holder.

Reference is made herein to the attached drawings. Like reference numerals are used throughout the drawings to depict like or similar elements of the thigh mounted holder. For the purposes of presenting a brief and clear description of the present invention, the preferred embodiment will be discussed as used for storing a mobile electronic device, credit cards, cash, and the like on a user's person. The figures are intended for representative purposes only and should not be considered to be limiting in any respect.

Figure 2:
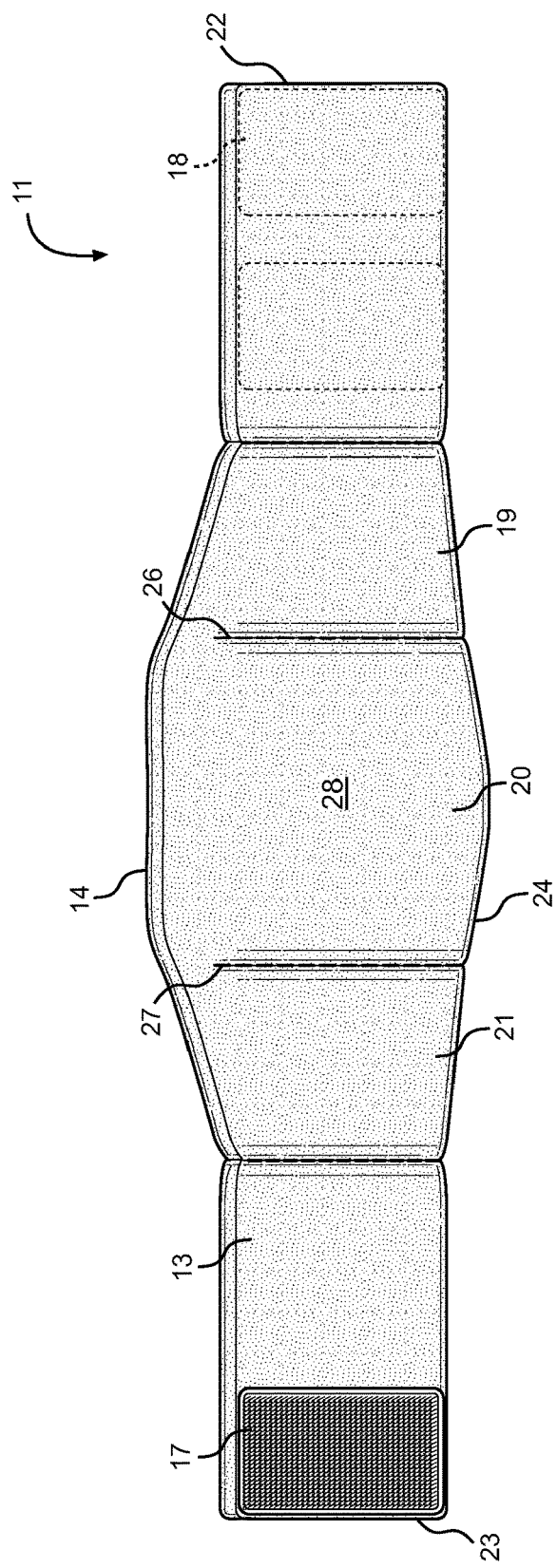
FIG. 2 shows a perspective view of the rear side of the thigh mounted holder.

Referring now to FIGS. 1 and 2, there is shown a perspective view of the front side of the thigh mounted holder and a perspective view of the rear side of the thigh mounted holder, respectively. The thigh mounted holder 11 comprises an elongated front panel 12 secured to an elongated rear panel 13, wherein the panels 12, 13 overlay one another and form a plurality of pockets therebetween. The front and rear panels 12, 13 are composed of a flexible and stretchable material configured to wrap around and conform to the shape of a user's thigh, wherein the material can stretch so as to allow the holder to fit tightly against the user's thigh. In the illustrated embodiment, the panels 12, 13 are composed of a padded material, such as neoprene having a three (3) millimeter thickness, so as to provide comfort the user when the front panel 12 is positioned against the thigh. In some embodiments, the exterior surface 28 of the rear panel 13 comprises a moisture absorbing layer so as to absorb sweat formed between the rear panel 13 and the thigh of the user. The moisture absorbing layer covers the portions of the exterior surface 28 configured to contact a user's thigh.

The front panel 12 is secured to the rear panel 13 along the edges of a lower end 24 and the lateral sides thereof. The panels 12, 13 are secured to one another via any suitable fastener, such as stitching or adhesive. The front panel 12 and the rear panel 13 form a first pocket 20 disposed centrally between the first and second end 22, 23 of the holder 11. The first pocket 20 has an open upper end adapted to receive an electronic mobile device therethrough, such as a smartphone. The first pocket 20 is configured to support the mobile electronic device in a secure position, such that the mobile electronic device remains inside the first pocket 20 when the holder 11 is secured to the user's thigh. The first and second lateral sides 26, 27 of the first pocket 20 are formed by seams extending perpendicularly from the lower end 24 of the panels 12, 13.

The interior volume of the first pocket 20 is configured to securely receive the mobile electronic device. In the illustrated embodiment, the mobile electronic device is a smartphone (shown in FIGS. 3 and 4), wherein the interior volume of the first pocket 20 comprises a latitudinal length no larger than 90 millimeters and a latitudinal width of no larger than 10 millimeters. In some embodiments, the material of the first pocket 20 is restricted from stretching beyond the latitudinal length of 90 millimeters and the latitudinal width of 10 millimeters. In other embodiments, the first pocket 20 comprises an interior volume having a dimension configured to tightly receive smartphones of various other sizes. The tautness of the front and rear panel 12, 13 against a smartphone placed therein allows a user to freely move without the smartphone falling out of the open upper end of the pocket 20. In the illustrated embodiment, the interior volume of the first pocket 20 comprises a rectangle shaped cross section.

In the illustrated embodiment, a second pocket 19 is formed between the front and rear panels 12, 13, wherein the second pocket 19 is adjacent to the first lateral side 26 of the first pocket 20. Further, a third pocket 21 is formed between the front and rear panels 12, 13, wherein the third pocket 21 is adjacent to the second lateral side 27 of the first pocket 20. The first, second, and third pockets 19, 20, 21 are aligned in side by side manner. In the illustrated embodiment, the second and third pockets 19, 21 are substantially identical in size and are configured to rest on opposing sides of the thigh.

The second and third pockets 19, 21 each comprise an open upper end, wherein the upper ends are configured to receive credit cards, cash, and the like. In the illustrated embodiment, the interior volume of the second and third pockets 19, 21 are formed when the front panel 12 is manually separated from the rear panel 13. Otherwise, when the panels 12, 13 are not being manipulated, the panels 12, 13 are biased to rest flush against one another. In this way, the credit cards, cash, and other items stored within the second and third pockets 19, 21 are secured therein. In some embodiments, a fastener, such as a zipper, is disposed along the upper end of the second and third pockets 19, 21 in order to further secure the objects stored therein.

The exterior surface 28 of the rear panel 13 is configured to rest flush against a user's thigh. The rear panel 13 comprises a greater height than the front panel 12, wherein the height is measured as the distance between the lower end 24 and the upper end of the rear panel 13. The upper end 14 is configured to serve as a barrier between the thigh and objects placed between the front and rear panels 12, 13. In this way, objects are prevented from rubbing against the user and irritating his or her skin. The gap formed between the upper end 14 of the front and rear panels 12, 13 serve to assist a user when inserting and removing objects placed within the pockets 19, 20, 21. The upper ends 14 of the panels 12, 13 are readily separated in order to access the interior volume of the pockets 19, 20, 21. In some embodiments, a lip extends perpendicularly from the upper end 14 of the rear panel 13 towards the front panel 12 so as to prevent objects disposed within the pockets 19, 20, 21 from exiting the pockets. The lip extends along the periphery of the upper end 14 of the rear panel 13 that extends above at least the first, second, or third pocket 19, 20, 21.

A first end 22 of the holder 11 is removably securable to an opposing second end 23 of the holder 11 so as to form a loop. The ends 22, 23 of the holder 11 are the lateral sides of the joined panels 12, 13, such that the front and rear panels 12, 13 are configured to wrap around a user's thigh and fit tightly thereto. The opposing ends 22, 23 connect via a fastener. In the illustrated embodiment, the fastener is hook and loop fastening material 17, 18. The hook fastener 17 is disposed along the edge of the second end 23 of the exterior surface 28 of the rear panel 13 and the loop fastener 18 is disposed along the edge of the first end 22 of the exterior surface 16 of the front panel 12. The hook and loop fasteners 17, 18 are configured to align facing one another when the first end 22 overlaps the second end 23. In some embodiments, additional loop fasteners 18 are provided adjacent to the edge of the first end 22, such that the length of the loop formed can be adjusted so as to allow the holder 11 to fit snugly against thighs of various sizes. However, the depicted fastener of the present invention is merely illustrative and the present disclosure contemplates other fasteners configured to removably secure the first end 22 to the second end of the thigh mounted holder 11.

In the illustrated embodiment, an alignment member 15 is disposed on the front panel 12 for indicating to the user by touch the location of the first pocket 20 when attached to the thigh. Further, the alignment member 15 includes indicia that visually indicates the position of the first pocket 20. The indicia is any suitable image having a position on the first pocket 20, such as a logo or other image or writing thereon, wherein the same indicia is not provided on any other area of the holder 11. The user will become familiar with the indicia and associate the indicia with the first pocket 20. The alignment member 15 is disposed an equal distance between the first and second lateral sides 26, 27 of the first pocket 20. The first pocket 20 is configured to align above the knee, on the thigh on a front side of the user's body. This alignment allows a user to conveniently reach down with his or her hand and quickly access and remove his or her smartphone when needed. However, due to the location of the thigh and the inability for a user to readily view his or her own thigh, it can be difficult for a user to properly align the first pocket 20 without bending over in an awkward position or standing in front of a mirror when attaching the thigh mounted holder 11 to one's person. Further, if the holder 11 when worn moves out of position, the user can feel for the alignment member 15 and recognize where the first pocket 20 is oriented. Then, if needed, the user can rotate the holder 11 around the thigh, back into proper alignment by positioning the alignment member 15 on the front of the thigh. The proper position of the holder 11 relative to the front of the user's thigh allows free bending of the user's knee without interference with the holder 11 or any objects contained within the pockets 19, 20, 21. In alternate embodiments, the alignment member 15 is positioned on other pockets in order to indicate to a user the proper alignment of the respective pocket having the alignment member 15 thereon.

In the illustrated embodiment, the alignment member 15 is an applique that adds a layer of material to the exterior surface 16 of the front panel 12, over the first pocket 21. The applique can have any texture that is different from that of the front panel 12 so as to alert the user of the location of the first pocket 20 by touching the applique relative to the panel and recognizing a difference in materials through touch. For example, in some embodiments, the applique comprises a surface having a plurality of ridges and the exterior surface 16 of the front panel 12 comprises a smooth surface. The appliques is secured to the front panel 12 by any suitable means, such as adhesive or stitching.

Figure 3:
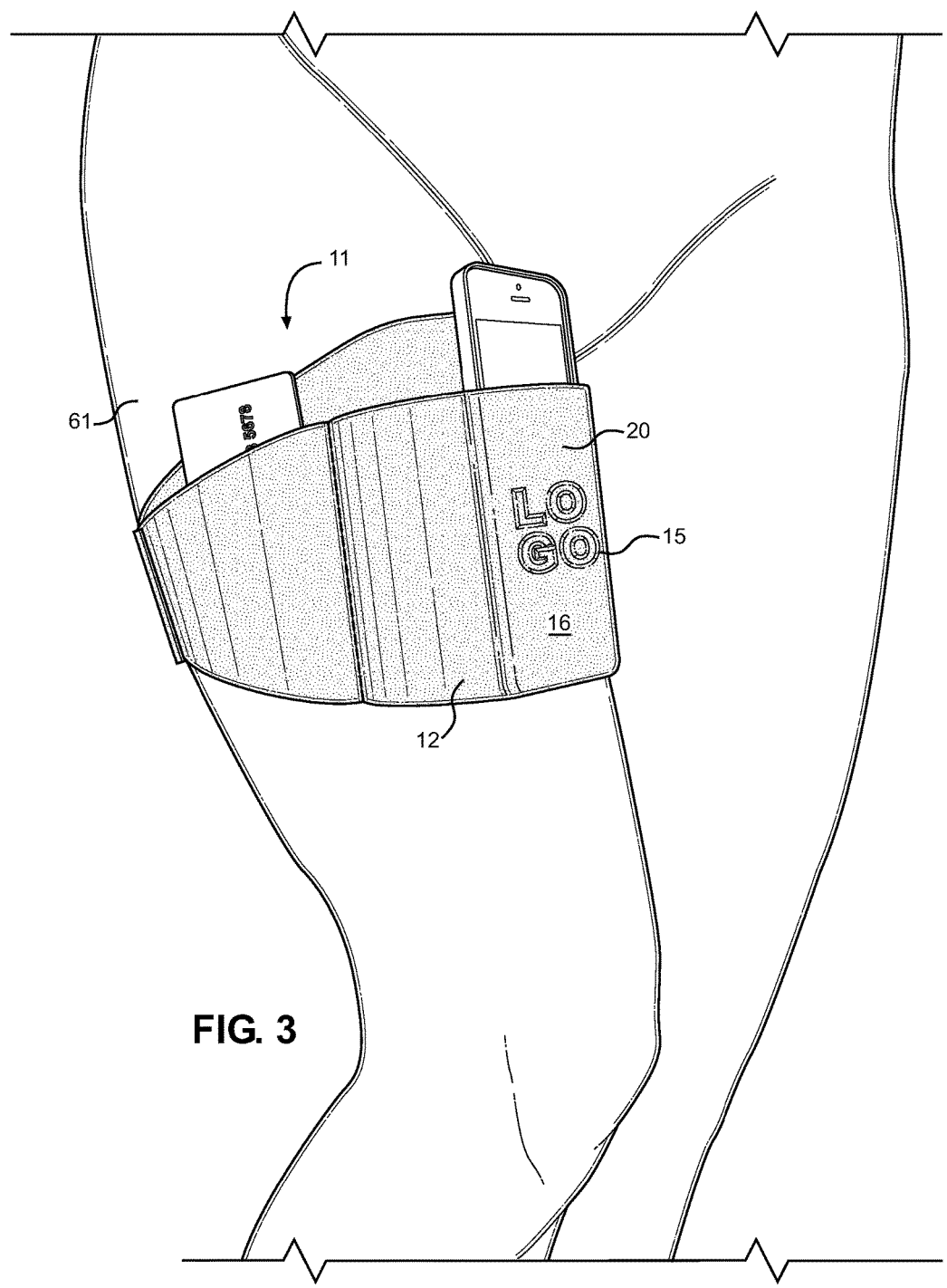
FIG. 3 shows a perspective view of the thigh mounted holder wherein the alignment member is indented.
Figure 4:
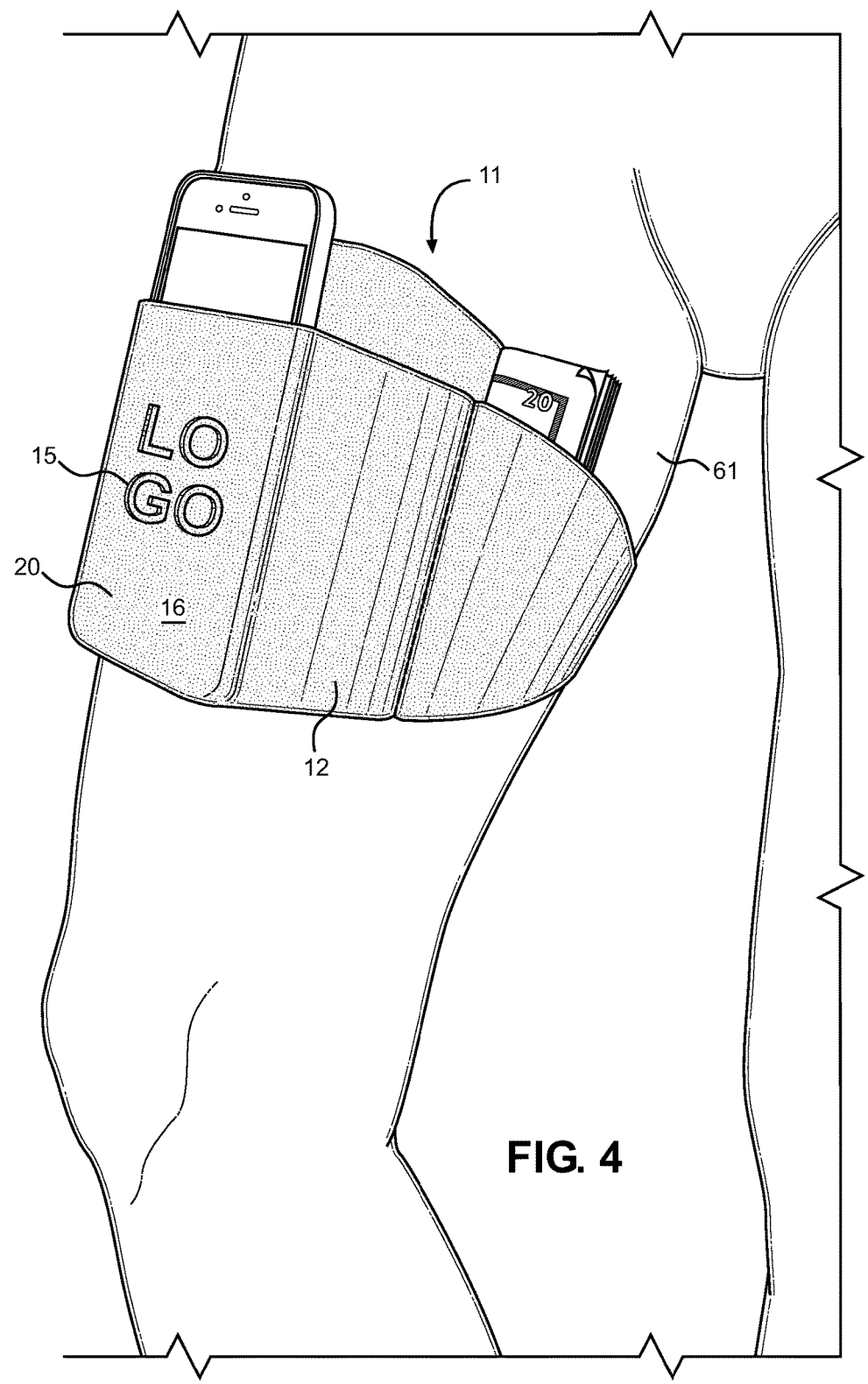
FIG. 4 shows a perspective view of the thigh mounted holder wherein the alignment member is raised.

Referring now to FIGS. 3 and 4, there is shown a perspective view of the thigh mounted holder wherein the alignment member is indented and a perspective view of the thigh mounted holder wherein the alignment member is raised. In alternate embodiments, the alignment member 15 comprises an indentation disposed on the exterior surface 16 of the front panel 12, as seen in FIG. 3. In some embodiments, the alignment member 15 is raised from the surface 16 of the front panel 12 so as to create a protrusion extending outward from the front panel 12. Each alignment member 15 comprises a difference on the exterior surface 16 of the front panel 12 such that a user is informed of the first pocket 20 location when the indentation or protrusion or applique is touched. In some embodiments, the alignment member 15 can serve as a logo in addition to the function of alerting a user of the location of a pocket without having to physically view the thigh mounted holder 11.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A thigh mounted holder, comprising:
   a rear panel and a front panel forming a main portion disposed intermediate a pair of side portions laterally disposed on opposing sides of the main portion;
   the rear panel coextensive with the front panel each extending entirely from a first end to a second end of the thigh mounted holder between the lower end and an upper end of the rear panel, wherein the rear panel and the front panel have a shared lower seam at a lower end;
   the main portion only comprising a first pocket disposed central to a second pocket and a third pocket, the first pocket being equidistance to the first end and the second end;
   the first pocket shares a right common side seam with the second pocket;
   the first pocket shares a left common side seam with the third pocket;
   wherein each pocket includes an open upper end that is permanently open and provides access to an interior volume of each respective pocket, wherein the interior volume is configured to house an electronic device therein;
   wherein the front panel and back panel are biased towards each other and configured to retain objects housed within each respective pocket;
   wherein the interior volume of the first pocket is larger than the interior volume of either the second pocket and the third pocket, wherein the interior volume of the second pocket and the third pocket are dimensionally identical;
   a height of the rear panel is greater than a height of the front panel at the main portion forming an exposed portion, the exposed portion configured to provide a surface to slidably fit objects within the respective pockets without otherwise manipulating the open upper end;
   wherein the pair of side portions removably securable to each other so as to form a loop, wherein the loop is configured to wrap around a thigh of a user in a worn position;
   wherein the worn position the front pocket is disposed on a front of the thigh and the second pocket and the third pocket are disposed on respective sides of the thigh.

2. The thigh mounted holder of claim 1, further comprising an alignment member disposed on an exterior surface of the front panel.

3. The thigh mounted holder of claim 2, wherein the alignment member is disposed on the front panel, an equal distance between a first lateral side of the front panel and a second lateral side of the front panel.

4. The thigh mounted holder of claim 2, wherein the alignment member comprises a raised surface.

5. The thigh mounted holder of claim 2, wherein the alignment member comprises an indented surface.

6. The thigh mounted holder of claim 2, wherein the alignment member is an applique composed of material different than that of the front panel.

7. The thigh mounted holder of claim 1, a loop fastener disposed on a first side of the front panel and a hook fastener disposed on a second side of the rear panel, wherein the loop fastener removably secures to the hook fastener.

8. The thigh mounted holder of claim 1, wherein the first pocket and the second pocket are formed by a shared seam extending from a lower end of the front panel and the rear panel and extending towards an upper end therefrom.

9. The thigh mounted holder of claim 1, wherein the front panel and the rear panel are composed of a flexible material, wherein the flexible material is configured to wrap around a user's thigh.

10. The thigh mounted holder of claim 1, wherein the front panel and the rear panel are composed of neoprene having a thickness of three millimeters.

11. The thigh mounted holder of claim 1, wherein the front panel and the rear panel are a same length.

* * * * *